United States Patent [19]

Hager et al.

[11] Patent Number: 5,016,973

[45] Date of Patent: May 21, 1991

[54] CABLE REINFORCEMENT FOR AN OPTICAL FIBER CABLE

[75] Inventors: Thomas P. Hager, Westerville, Ohio; Ralph S. Dale, Aiken, S.C.

[73] Assignee: Owens-Corning Fiberglas Corporation, Toledo, Ohio

[21] Appl. No.: 398,861

[22] Filed: Aug. 25, 1989

[51] Int. Cl.⁵ .............................................. G02B 6/44
[52] U.S. Cl. ............................................. 350/96.23
[58] Field of Search .................................. 350/96.23

[56] References Cited

U.S. PATENT DOCUMENTS

| Re. 32,436 | 6/1987 | Hartig | 350/96.23 |
|---|---|---|---|
| 4,172,106 | 10/1979 | Lewis | 264/1 |
| 4,226,504 | 10/1980 | Bellino | 350/96.23 |
| 4,239,335 | 10/1980 | Stiles | 350/96.23 |
| 4,241,979 | 12/1980 | Gagen et al. | 350/96.23 |
| 4,304,462 | 12/1981 | Baba et al. | 350/96.23 |
| 4,457,582 | 7/1984 | Mayr et al. | 350/96.23 |
| 4,505,541 | 3/1985 | Considine et al. | 350/96.23 |
| 4,514,035 | 4/1985 | Steinmann et al. | 350/96.23 |
| 4,534,618 | 8/1985 | Bruggendieck | 350/96.23 |
| 4,552,433 | 11/1985 | Titchmarsh | 350/96.23 |
| 4,605,818 | 8/1986 | Arroyo et al. | 174/107 |
| 4,647,151 | 3/1987 | Grogl et al. | 350/96.23 |
| 4,653,851 | 3/1987 | Pedersen et al. | 350/96.23 |
| 4,659,174 | 4/1987 | Ditscheid et al. | 350/96.23 |
| 4,709,983 | 12/1987 | Plessner et al. | 350/96.23 |
| 4,715,676 | 12/1987 | Sutehall et al. | 350/96.23 |
| 4,715,677 | 12/1987 | Saito et al. | 350/96.23 |
| 4,723,831 | 2/1988 | Johnson et al. | 350/96.23 |
| 4,730,894 | 3/1988 | Arroyo | 350/96.23 |
| 4,763,982 | 8/1988 | Greveling | 350/96.23 |
| 4,765,712 | 8/1988 | Bohannon, Jr. et al. | 350/96.23 |
| 4,778,246 | 10/1988 | Carroll | 350/96.23 |
| 4,913,515 | 4/1990 | Braunmiller et al. | 350/96.23 |

OTHER PUBLICATIONS

"Volume II, Cable Specifications, May 1986", Kessler Marketing Intelligence, Newport, Rhode Island 02840.

Primary Examiner—William L. Sikes
Assistant Examiner—Robert E. Wise
Attorney, Agent, or Firm—Patrick P. Pacella; Ted C. Gillespie; James F. Porcello, Jr.

[57] ABSTRACT

The invention provides for a dielectric optical fiber cable reinforced by a yarn made by spinning synthetic staple fibers around a glass core. The optical fibers are sheathed by the yarn reinforced glass core and then enclosed in a polyethylene jacket. When heated, the yarn fuses with the polyethylene jacket forming a rigid cable member.

14 Claims, 1 Drawing Sheet

CABLE REINFORCEMENT FOR AN OPTICAL FIBER CABLE

BACKGROUND OF THE INVENTION

This invention relates to fiber optic cables and the structure for reinforcing the tensile and compressive strength characteristics of the optical fibers contained within the fiber optic cables. Specifically, the invention is directed toward an improved structure for use in low fiber-count cable construction.

It is well known that small, light-transmitting optical fibers are mechanically fragile and exhibit poor strength characteristics. Typically, fiber optic cables which are intended for use in outside environments are designed for long-haul applications and such cables, therefore, have a medium to high fiber-count. Such long-haul cables are relatively rigid and have a relatively large bending radius as a result of the high fiber-count and resulting cable structure. These long-haul type cables are undesirable for use in short-haul applications where local distribution type networks typically require fiber optic cables having great flexibility and low fiber counts. A requirement of such short-haul local distribution fiber optic cables is that the cable be greatly flexible and have a small bending radius so that it is useable in a variety of environments.

The challenge of providing a low count fiber optic cable having desirable flexibility, small bending radius, as well as appropriate tensile and compressive strength characteristics has produced a large variety of cable structures. For instance, U.S. Pat No. 4,723,831 provides a cable construction consisting of optical fibers centrally located within an overwrap. An outer jacket of plastic material such as polyvinylchloride encloses the overwrapped optical fibers and has glass strength members imbedded within the jacket. The glass optical fibers are treated with a coupling agent such as a urethane so that they are coupled with the jacket to have a desired pullout strength of more than 40 pounds per square inch. U.S. Pat. No. Re. 32,436 discloses the use of a optically transparent silica core that is protected by fibers positioned parallel to the core which are used as strength members in tension. A plastic jacket is extruded around the combination of core and fibers. The reinforcement fibers are designed to have an elastic modulus of at least 10 million psi. Another short-haul design, U.S. Pat. No. 4,241,979 provides a cable structure in which strength members (steel wire or non-metallic fibers) are bedded in a bedding compound of a thin layer of spun bonded polyester. An outer jacket of polyethylene is extruded over the bedding layer and the strength members. The thickness and compliance of the bedding layer determines the amount of coupling between the plastic jacket and the strength members.

It is known that there are numerous designs of fiber optic cables which are all directed, in some way, to creating specific tensile and compressive strength in the cable while providing a desired flexibility and low bending radius. The design approaches have centered on two successful alternatives. The first includes at least one buffer tube containing the optical fibers positioned longitudinally or helically and surrounded by strength members and sheathing. The unstranded loose-tube cable provides for some flexibility and separates tensile and compressive forces from the optical fiber. In other designs a buffer tube filled with a compound to prevent the intrusion of water and other liquids into the cable is surrounded by strength members and sheathing. These designs have been modified in other applications to include a steel armour coupling surrounding the buffer tube and strength members to prevent destruction of the fiber optic cable by rodents.

A secondary focus in the design of fiber optic cables is the appropriate provision of anti-buckling characteristics into the cable. Anti-buckling is defined as the resistance provided by a material to cable shrinkage. Generally, the anti-buckling can be estimated by the low temperature modulus of the cable materials times the change in length at low temperature. The amount of anti-buckling required must usually control the cable shrinkage from between 0.2% to 0.8%. Anti-buckling is provided through emphasis on materials used in jackets, overcore concepts and circumferentially or helically applied anti-buckling materials.

Finally, while providing the necessary tensile and compressive strength as well as desired anti-buckling characteristics, the cable design must provide sufficient cable flexibility to provide ease of usage by technicians when installing the cable. Expectations generally require that a cable be capable of withstanding bends within a radius of 10 times the cable diameter. This flexing, crushing and twisting of the cable is a very real part of the cable environment and, therefore, must be accounted for in the cable design.

There is a continued need for an inexpensive, simple optical fiber cable construction which offers anti-buckling, tensile, and compressive strength in the cable member while maintaining cable flexibility and other desirable characteristics.

SUMMARY OF THE INVENTION

The present invention provides an improved optical fiber cable reinforced by a yarn made by spinning synthetic staple fibers around a glass core. The optic fibers are sheathed by the yarn reinforced glass core and then enclosed with a polyethylene jacket. The yarn, having a glass core, provides the desired tensile amd compressive strength yet offers the flexibility in the cable design because the yarn reinforced glass core processes like a textile.

The present invention provides a flexible optical cable to an end user that can be easily managed during installation and then heated to stiffen and set the yarn wrapping, thereby creating an optical fiber cable having all the desired strength characteristics. Further, the yarn can be designed to have a melting point sufficient to fuse the yarn with the polyethylene jacket, thereby creating an integral outer shell on the optic fiber. Such a structure solves current problems encountered with reinforcing yarns which are not coupled to the outer jacket. In such prior designs, if the cable is pulled by the jacket, the jacket has a tendency to tear away from the cable. Thus, during installation, the outer jacket must be stripped off, and the reinforcing yarns attached to a pulling tool to pull and install the cable. The present invention cures this installation problem by providing an integral reinforced fusion between the shell and the yarn of the optic fiber cable.

The yarn reinforced polyethylene jacket further provides better protection of the cable from damage by the environment, handling damage and assists in the prevention of rodent damage. The yarn reinforced jacket is also a completely dielectric optical cable, thereby eliminating the need for costly grounding apparatus while ensuring that the cable is resistant to lightening strikes.

DESCRIPTION OF THE PREFERRED EMBODIMENT

Figure 1:
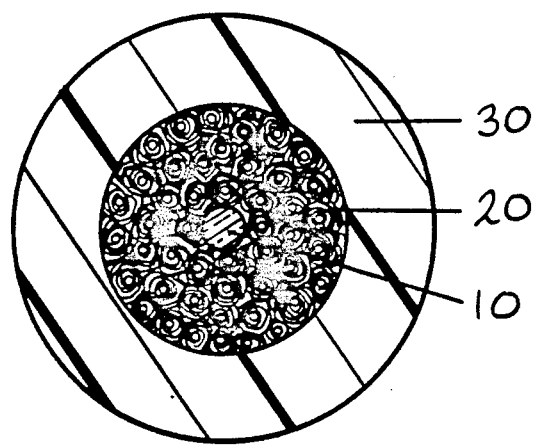
FIG. 1 is a cross-sectional view of an optical fiber cable constructed in accordance with the present invention.
Figure 2:
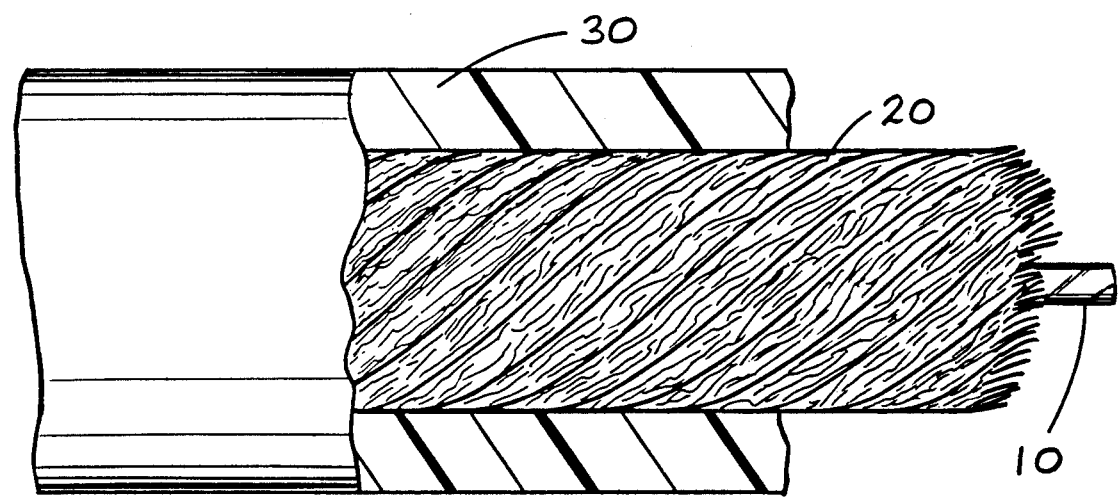
FIG. 2 is a fragmented perspective view of an optical fiber cable constructed in accordance with the present invention.
Figure 3:
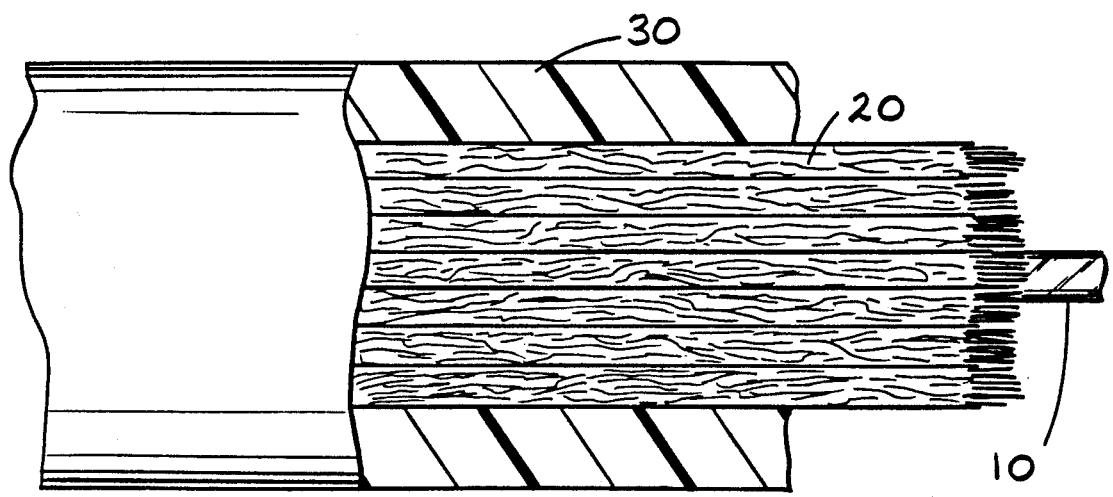
FIG. 3 is a fragmented perspective view of an alternative embodiment of an optical fiber cable constructed in accordance with the present invention.

The preferred embodiment of the present invention provides a low count optical fiber cable consisting of at least one optical fiber 10 sheathed by a yarn 20 composed of synthetic staple fibers wrapped around a glass core. The yarn enclosed fiber optic cable is then covered with a reinforcing jacket 30. The reinforcing yarn is made by spinning any number synthetic staple fibers around the glass core in a process known by the trademark DREF ® owned by Fehrer A. G. of Liz, Austria. The DREF ® yarns 20 offer a textile product that has a high tensile strength and yet can be processed and wound onto packages, wrapped around a cable, braided, woven, knitted, etc. The glass core of the DREF ® yarn 20 provides the high tensile strength while the synthetic fiber offers the processing capabilities. Further, if the yarn is heated, the synthetic fibers flow and fuse producing a rod with a glass core in a plastic sheath.

The optical fiber cable utilizes the processing of the DREF ® yarn 20 in combination with an outer jacket 30 which is preferably composed of polyethylene. The resulting cable structure is a flexible reinforced cable which, when heated, will become rigid and have high tensile and compressive strength characteristics. Upon heating, the DREF ® yarn 20 wrapping melts into the outer polyethylene jacket 30 thereby forming an integral reinforcing jacket. This dielectric cable is then capable of easy installation and upon being installed is protected from rodent damage due to the existence of glass fibers in the reinforcing jacketing.

The use of the DREF ® yarn eliminates costly structural needs in cable manufacturing such as the central stiffness members and other fibers including aramid and Kevlar ® fibers. The cable structures such as those disclosed in the prior art therefore become overly complex and unnecessary. Of course, if design requirements warrant, the DREF ® yarn can be used in combination with any of the already existing reinforcement structures to provide a cable of hybrid design.

In use, the optical fiber cable manufactured with the DREF ® yarn reinforcements, is wound upon a spool, and sent to the point of usage. At the point of usage, the DREF ® yarn reinforced cable can be installed while simultaneously extruding the polyethylene jacket thereby providing rigidity to the cable as it is installed. If a low melting point polyester is used as the synthetic staple fiber, multiple flow and mixing will occur between the polyethylene jacket and the polyester thereby reinforcing the jacket and providing further increased strength modulus and tensile strength to the cable.

The fiber optic cable of the present invention can be manufactured according to the following process. It is noted that this process is not the exclusive method of manufacture of this cable and it is being offered here for the purposes of illustration and is not intended to be limiting upon the scope of this invention. The prepared optic fibers 10, which may be one fiber or a low-count combination of fibers, are received from a manufacturing source generally having two acrylic coatings. The first coating matches the glass refractive index and the second coating is for abrasion resistance. After the optical fiber 10 has been conditioned to reduce and stabilize the moisture content on the fiber surface, the fiber can be dyed if desired to later aid in communication hook-ups while installing the cable. The fibers are then coated with a waterproofing and a color coordinated polyethylene jacket is extruded around the individual fibers. The sealed fibers are then coated with further waterproofing material and drawn through a spinner where the reinforcing DREF ® yarn 20 is applied. The spinner which applies the reinforcing yarn to the cable can handle up to sixteen packages of yarn at one time. As the cable is fed through the spinner's center, the yarn is wrapped onto it in a specified angle controlled by the relative rate of the cable. At this point, the yarn 20 reinforced fiber optic cable 10 can be wound onto a spool and sent to the point of usage. At the point of usage, the yarn reinforced cable is installed while simultaneously extruding a polyethylene jacket 30 onto the cable. The heat of the extruded polyethylene causes the yarn fibers to fuse with the polyethylene jacket and the cable stiffens. An alternative end step in manufacturing process envisions the extrusion of a polyethylene jacket 30 around the cable and drawing the cable through a water quench bath and onto a reel, immediately after the cable lease the spinner apparatus.

The above description of the preferred embodiment of the present invention and the method of manufacturing this invention are intended to be illustrative and are not intended to limiting upon the scope and content of the following claims.

We claim:

1. An optical cable member comprising at least one optical fiber wrapped with a sheath of yarn, said yarn consisting of a core member encased with spun synthetic staple fibers and an outer jacket surrounding said yarn wrapped optical fiber.

2. The optical cable of claim 1, wherein said core member of said yarn consists of a glass member.

3. The optical cable of claim 1, wherein said yarn is composed of aramid fibers.

4. The optical cable of claim 1, wherein said yarn is composed of a thermosetting material.

5. The optical cable of claim 1, wherein said yarn consists of polyester staple fibers spun over glass fibers.

6. The optical cable of claim 5, wherein said outer jacket is further composed of polyethylene.

7. The optical cable of claim 1, wherein said outer jacket is composed of polyethylene.

8. A dielectric cable member comprising a core member wrapped in a sheath of yarn, said yarn consisting of a glass fiber encased with spun synthetic staple fibers and an outer jacket surrounding said yarn wrapped core member.

9. The cable member of claim 8, wherein said core member includes at least one optical fiber.

10. The cable member of claim 8, wherein said yarn is composed of polyester staple fibers spun over said glass fiber.

11. The cable member of claim 10, wherein said outer jacket is further composed of polyethylene.

12. The cable member of claim 8, wherein said outer jacket is composed of a thermosetting material.

13. An optical cable member comprising at least one optical fiber wrapped with a sheath of yarn, said yarn consisting of a glass core member encased with synthetic staple fibers, and an outer jacket composed of polyurethane surrounding said yarn wrapped optical fiber.

14. The cable member of claim 13, wherein said synthetic staple fibers are composed of a thermosetting material, whereby said cable member is flexible until application of heat to said cable member to melt said synthetic staple fibers and said polyurethane, thereby providing a blended outer sheath surrounding said optical fiber which, upon cooling, stiffens to produce a non-flexible cable member.

* * * * *